(12) United States Patent
Lucas et al.

(10) Patent No.: US 6,732,092 B2
(45) Date of Patent: May 4, 2004

(54) METHOD AND SYSTEM FOR DATABASE QUERIES AND INFORMATION DELIVERY

(75) Inventors: Scott Lucas, Palm Desert, CA (US); Erik Moore, Austin, TX (US)

(73) Assignee: Client Dynamics, Inc., Irvine, CA (US)

( * ) Notice: Subject to any disclaimer, the term of this patent is extended or adjusted under 35 U.S.C. 154(b) by 0 days.

(21) Appl. No.: 09/966,355

(22) Filed: Sep. 28, 2001

(65) Prior Publication Data

US 2003/0065649 A1 Apr. 3, 2003

(51) Int. Cl.[7] .............................................. G06F 17/30
(52) U.S. Cl. .................. 707/3; 707/6; 705/10; 725/46
(58) Field of Search ................ 707/3, 6; 705/10; 725/46

(56) References Cited

U.S. PATENT DOCUMENTS

| | | | |
|---|---|---|---|
| 5,717,923 A | 2/1998 | Dedrick ................. 395/613 |
| 5,754,938 A | 5/1998 | Herz et al. ............... 455/4.2 |
| 5,855,015 A | 12/1998 | Shoham | |
| 5,890,152 A | * 3/1999 | Rapaport et al. ............. 707/6 |
| 5,893,110 A | 4/1999 | Weber et al. | |
| 5,983,227 A | 11/1999 | Nazem et al. ................ 707/10 |
| 6,005,597 A | * 12/1999 | Barrett et al. ................. 725/46 |
| 6,070,149 A | 5/2000 | Tavor et al. | |
| 6,085,242 A | 7/2000 | Chandra ..................... 709/223 |
| 6,094,649 A | 7/2000 | Bowen et al. ................ 707/3 |
| 6,161,112 A | 12/2000 | Cragun et al. ............. 707/501 |
| 6,209,007 B1 | 3/2001 | Kelley et al. ............... 707/513 |
| 6,212,517 B1 | 4/2001 | Sato et al. | |
| 6,236,991 B1 | 5/2001 | Frauenhofer et al. ......... 707/6 |
| 6,278,449 B1 | 8/2001 | Sugiarto et al. ............ 345/334 |
| 6,311,194 B1 | 10/2001 | Sheth et al. ................ 707/505 |
| 6,401,094 B1 | 6/2002 | Stemp et al. ................ 707/10 |
| 2001/0032115 A1 | * 10/2001 | Goldstein ..................... 705/10 |
| 2003/0065649 A1 | * 4/2003 | Lucas et al. ................... 707/3 |

* cited by examiner

Primary Examiner—Charles Rones
(74) Attorney, Agent, or Firm—Fish & Neave

(57) ABSTRACT

The present invention provides for a method and system of importing or creating individual profiles with associated keyphrases and querying all sources of information on a network based on user-based or individual-based keyphrases with relevant objects, such as documents, retrieved based on keyphrase occurrence and based on association to individuals who have matching keyphrases, thereby allowing the user to easily identify interested individuals and electronically mail relevant objects of interest to selected individuals or to add objects to an action list.

20 Claims, 7 Drawing Sheets

METHOD AND SYSTEM FOR DATABASE QUERIES AND INFORMATION DELIVERY

BACKGROUND OF THE INVENTION

One key element in a successful partnership between relationship managers and their clients is the exchange of timely and relevant communication. Traditional relationship managers include brokers, agents, sales professionals, stock brokers, financial advisors, real estate agents, travel agents, insurance agents, professionals (such as doctors and lawyers), and any person who initiates contact with clients or customers. The goal of a successful relationship manager is to further develop, enhance and grow the relationship with their clients. However, relationship managers lack the adequate tools to perpetuate new reasons to contact the client to achieve these goals.

Specifically, one of the most significant attributes a successful relationship manager must have is the ability to stay abreast of the news and information which affects their area of specialization as well as the interests of their clients. Presently, the only tools available to the relationship manager are back-end customer relationship management (CRM) applications such as ACT and Goldmine, web browsers such as Internet Explorer, Netscape or AOL, standard web-based search engines and electronic mail utilities.

These prior art tools do not adequately assist the relationship manager. For example, the CRM tools only solve the problem of organizing client information after the relationship manager has already initiated contact with the client or potential client. The CRM tools are used to collect information about the client and possibly record notes regarding prior conversations with the client. Similarly, the web browser is limited to pointing to any domain name address the user purposely finds and manually inputs. The web-based search engines are limited to finding articles or links based on a formula determined by the search engine provider who usually ranks returned results based on the highest commercial bidder vying for a high ranking in the search engine. Electronic mail requires an address book, forcing the user to duplicate the client profile information stored in the CRM, and also requires the manual process of cutting and pasting information into the body of the message. Presently, a novel, advanced and complete solution is required to efficiently find information relevant to the interests of one or more clients, and a means to quickly provide that information that is located to the interested clients.

To illustrate further, the prior art solution requires a complex and tedious number of manual steps. First, the relationship manager ("user") must open the CRM application and browse through client information, interests and notes. The user then opens a web browser and points to a search engine such as msn.com, altavista.com or askjeevescom. Next, the user refers back to the CRM to relocate a specific client and decide on the client's interests based on information in a single client's profile. Then, the user manually enters terms or phrases representing that specific client's interests in the web browser and initiates a single search on the world wide web utilizing a single search engine. After the search engine results are returned, the user must read through the listing of retrieved results, open each resulting link, read the retrieved article and determine if the article provides useful information that should be delivered to the client. The user is burdened by the additional fact that the retrieved results quite often consist of irrelevant information that does not correspond to the terms of interest that were entered manually by the user.

If the user happens to find an article of interest from the thousands of retrieved search results, the user may (i) open his or her electronic mail application such as Outlook or Netscape Messenger, (ii) open an address book to find the client or retrieve the electronic mail address from the CRM, (iii) manually copy and paste the text of the article into an electronic mail message, and (iv) send the article to an individual client. Clearly, this is a very tedious process. Imagine the scenario where a typical user, such as a broker, has hundreds of clients, whereby this process would require most of the broker's time. The prior art solution causes the broker to fail at the primary goal of timely and relevant communication with one or more clients because: 1) the prior art solution requires an inordinate amount of the broker's time; 2) it is nearly impossible to keep track of the specific interests of each client; and 3) the sources of information are neither relevant to the interests of the client nor conveniently available.

In contrast, the present invention uses an advanced, multi-tiered database and information delivery algorithm to retrieve and deliver targeted news items, articles and information based on the interests of a client. The present invention eliminates the need for the tedious prior art process that requires a CRM application, a web browser, a search engine and an electronic mail utility.

The present invention provides the user, such as a broker or agent, with a solution to improving and enabling communication with their clients by utilizing algorithms that cross-reference the interests of clients with any information pool and present a list of clients who are interested in the relevant information. Specifically, a successful relationship manager requires the solution provided by the present invention to provide a competitive edge in finding specific news and information that pertain to the specific interests of their clients. The solution provided by the present invention adds significant value to the broker/client relationship and results in the broker's ability to increase communication with their existing clients and ultimately to increase their clientele.

A need exists to provide a method and system of discovering new and relevant reasons to precipitate communications with clients by querying news and information sources based on user-based and/or individual-based keyphrases.

Another need exists to provide one tool which allows the relationship manager, such as a broker or agent, to add client profile information and keyphrases based on clients' interests into a database by means of a graphical user interface.

A further need exists to allow the relationship manager to conduct a search of one or more information service providers based on the interests of all clients, a single client and/or the interests of the relationship manager and to view the retrieved results in a viewer.

A further need exists to allow the relationship manager to view the retrieved articles that pertain to specific clients' interests whereby each retrieved result is mapped by keyphrase, date, source and client name which have corresponding keyphrases of interest stored in the client/customer profile database.

Yet another need exists for a system and method that allows the relationship manager to import external information into the application and cross-reference that information with the interests of one or more clients to determine which clients would find that information helpful and would benefit by receiving a phone call, electronic mail or other form of communication from the relationship manager regarding the information.

Another need exists for a system and method that allows the relationship manager to take action by adding the relevant, retrieved information to an action list or to electronically mail the information to one or more interested clients.

The present invention relates to associating keyphrases of interest to one or more client/customer profiles and conducting queries on one or more news service databases for an entire clientele group. More particularly, the invention relates to a method and system of retrieving objects from one or more databases based on client/customer profiles with associated keyphrases by means of software on a personal computer, wireless device, or web-enabled phone; sorting retrieved objects; and taking action on selected retrieved objects. In addition, the present invention allows the user to import objects of interest and to query the objects of interest based on keyphrases, resulting in a cross-referenced list mapping the retrieved object of interest to clients who are interested such that the relevant objects of interest can be electronically mailed to particular interested clients.

The prior art solutions to enabling communication between a relationship manager, such as a broker or agent, and a client have been limited to performing manual searches by means of the world wide web and by manually obtaining client profile information stored in another application to conduct the search. The present invention provides a novel solution that allows the relationship manager to associate keyphrases to clients and to perform user-based or client/customer-based keyphrase queries on one or more external databases. The present invention performs the query and lists the retrieved results, such as articles, in a user interface with each result associated to a corresponding client who has keyphrases matching the retrieved results. The comprehensive display of retrieved results mapped to specific interested clients allows the user to take action, such as by electronically mailing the retrieved result to the client or by adding the result to an action list.

Although there are no known prior art teachings of a solution to the aforementioned deficiency and shortcoming such as that disclosed herein, the following prior art discusses subject matter that bears some relation. Shoham, U.S. Pat. No. 5,855,015—System and Method for Retrieval of Hyperlinked Information Resources, Dec. 29, 1998, provides a problem-solving query of the global computer network whereby the user continues to refine and narrow the scope of the search based on the retrieved results of the previous search.

The Shoham patent provides an interactive search technique whereby the user conducts a series of searches with each search continuing to refine the previous search. The Shoham patent does not disclose a method of associating keyphrases to client information profiles, retrieving articles from one or more databases, and listing the results in a user interface with each retrieved article mapped to one or more clients who have matching keyphrases.

Weber et al., U.S. Pat. No. 5,893,110 Browser Driven User Interface to a Media Asset Database, Apr. 6, 1999, provides a method for searching large movie production databases for the purpose of finding specific multimedia assets.

Weber only discloses a method for querying large movie production databases to find specific multimedia assets and does not contemplate searching news service databases based on one or more keyphrases and presenting the results in an interface which associates the retrieved articles to one or more clients with the corresponding interests.

Tavor et al., U.S. Pat. No. 6,070,149, Virtual Sales Personnel, May 30, 2000, provides a guided selling tool. Tavor et al. discloses a method of gathering user product preference information and conducting a search to find products of interest. Tavor et al. further provides techniques to encourage the user to purchase a matching product of interest. Tavor et al. only discloses a guided selling tool and does not contemplate an application querying one or more databases based on one or more keyphrases of interest and listing the retrieved documents or articles mapped to the corresponding clients.

Sato et al., U.S. Pat. No. 6,212,517, Keyword Extracting System and Text Retrieval System Using the Same, Apr. 3, 2001, provides a method to facilitate the ranking of retrieved articles based on occurrence of keywords found in each retrieved document. Sato et al. does not contemplate a query based on a user-based or client-based, single or multiple keyphrases and the subsequent mapping of the retrieved results to particular clients who have matching keyphrases stored in a client/customer profile database.

SUMMARY OF THE INVENTION

The present invention provides a method and system to query news service databases based on user-based or client-based keyphrases mapped to an imported or user-created client profile database and allows selected objects, such as articles or documents, to be added to an action list, in addition to importing external articles and querying the imported object based on keyphrases and mapping the imported object to interested clients for further action.

As a front-end application software database architecture and information delivery tool with a comprehensive, functional graphical user interface the present invention may import existing client/customer lists, add or create client/customer profiles, generate to-do lists and action items, retrieve text, web sites, articles and documents from one or more databases, add one or more keyphrases to each client/customer profile and, optionally, add user-based keyphrases. In addition, the application performs queries on informational databases for objects such as articles containing one or more keyphrases stored in the client/customer database and displays the retrieved results list with corresponding keyphrase, title, published date and associated client/customers who have profiles with matching keyphrases. The user may add retrieved articles to an action list, edit the retrieved information and edit client/customer profiles stored in the database. The application includes point and click electronic mail functionality for any retrieved news article or imported article and also searches the body of the retrieved or imported article for keyphrases based on client/customer profiles and returns names of clients who may be interested. The application also has the ability to import text from any external source and allow the user complete application functionality as if the imported text was a retrieved article.

The present invention is a method and system to be used by relationship managers, where relationship manager is defined as one who transacts business for another such as a dealer, stock broker, financial analyst, financial advisor, financial planner, direct sales, indirect sales, real estate agent, travel agent, insurance agent, professionals (such as doctors and lawyers) and any person who has any client or customer with whom they must initiate contact to enhance communication between the relationship manager and the client/customer. A client or customer, in the present invention, is defined as any person who obtains goods or services by means of a relationship manager. To avoid confusion with the computer science definition of the term "client", the term "individual" is used instead and represents the notion of the relationship manager's client or customer. In a preferred embodiment, the present invention is a software application tool and database that resides on a relationship manager's personal computer, hand-held device or web-enabled phone. The software application, by means of a graphical user interface, collects individual profile information which includes but is not limited to individual name, priority, company, electronic mail address, birth date, personal notes, phone numbers, keyphrases and an action items/to-do list. The present invention has an import algorithm to automatically load individual profile data from any external, commercially available database such as Microsoft® Outlook®, ACT®, Goldmine®, and others. Once individual profiles are imported, loaded or added to the application, the relationship manager associates keyphrases of interest to each individual profile. "Keyphrase" is defined as a significant or descriptive word or words that are used as a reference point for finding relevant objects. "Objects" are defined as any words or text such as news information, articles or documents stored in any electronic format such as html, xml, database, word processing document, or other electronic format. "Object" and "article" are used interchangeably throughout this disclosure.

To illustrate with an example, a hypothetical user, David Smith, a stock broker, imports client/customer profiles or creates profiles directly by means of the application's graphical user interface and successfully adds hypothetical clients John Doe through John Doe999 to the application's client/customer profile database. David Smith, the broker, already knows the interests or needs of one or more clients or communicates with each client to determine their interests or needs. The broker formulates these interests into significant, short-worded keyphrases. The broker will add keyphrases to each individual profile by means of the keyphrase wizard algorithm or directly by means of the individual profile graphical user interface. Broker, in the present example, will update the profile of John Doe. The broker brainstorms on which topics may interest John Doe in and may call John Doe directly to ask what are his hobbies and interests. Through the conversation, broker realizes that John Doe is interested in "financial tools" because of John's responsibilities as a software developer in the area of financial management; and is also interested in the lawsuit of "e-Bay vs Colby" because of the stock he owns in e-Bay. The broker, who already has John Doe's profile open in the application adds the keyphrases "financial tools" and "e-Bay Colby" separated by a delimiter to the individual's profile. Essentially, these keyphrases are simple word phrases that describe the interests of the individual and are associated to the individual's profile, are stored in the application client/customer profile database and are used for queries to retrieve articles of interest.

The broker may use the present invention in the preferred embodiment once one or more individual profiles and/or one or more keyphrases have been added to the client/customer profile database. The relationship manager now utilizes the significant advantages of the present invention by navigating to the primary dialogue box that allows the user to enter user-based keyphrases or to select one or more clients and one or more of their associated keyphrases. Whether using one or more user-based or individual-based keyphrases, the present invention queries one or more external information providers, databases or web sites and retrieves articles that have occurrences of the queried keyphrases.

After querying information databases based on one or more keyphrases, the resulting dialogue box presents the relationship manager with the retrieved articles listed by keyphrase, headline, date published and source. The source is the author, news service provider or information provider of the retrieved article. The retrieved articles may then be opened in a viewing dialogue box and a query is performed within the system to find interested individuals based on individual-based keyphrases. The relationship manager may also take action, such as adding the selected article to an action list or to-do list for future action or electronically mailing the highlighted article to one or more selected individuals at that time. The relationship manager may also import any object from any local computing device, network device or any other device to query the object based on keyphrases and to map the individuals who have corresponding keyphrases for the purposes of electronically mailing the article to interested individuals or adding the information to a to-do list.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

The present invention provides a method and system of importing or creating profiles of individuals with associated keyphrases that are stored in the application's client/customer database. In addition, the present invention provides a method and system of searching all sources of information on a network for articles based on keyphrases, retrieving articles by relevance, and mapping these retrieved or imported articles to individuals who have matching keyphrases thereby allowing the user to electronically mail articles of interest to one or more individuals or to add items to an action or to-do list.

Figure 1:
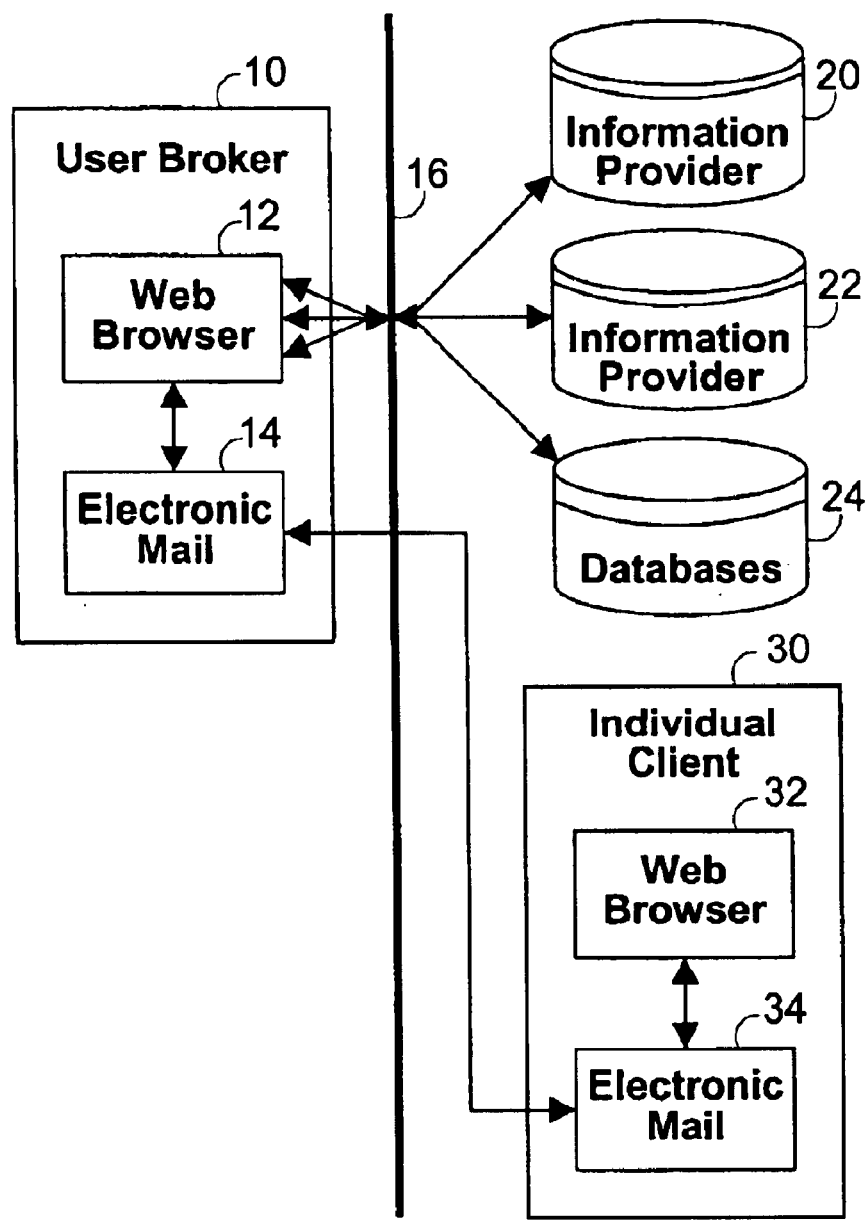
FIG. 1 (Prior Art) is a schematic illustrating the general method of operation of the prior art.

FIG. 1 is a schematic illustrating the general method of operation of the prior art. The problem of improving communication between the relationship manager and individual has been limited by a very tedious, manual mode of operation. In the following discussion, "broker" is defined as the more broadly interpreted term "relationship manager" and the two terms are used interchangeably. FIG. 1 shows one prior art method of attempting to solve the problem of insufficient communication with a client whereby a relationship manager would utilize their desktop computing system 10, comprised of a browser 12, a global computer network 16, information providers, 20 and 22, searchable databases 24 and individual computing device 30. For example, a broker, who is responsible for a clientele ranging from dozens of individuals to hundreds of individuals all with unique interests, would utilize their computing system 10 comprised of a global computer network browser 12 and an electronic mail application tool 14. The broker would initiate a search of interesting topics for a single individual by means of web browser 12 by pointing to a web-based search engine and entering keyphrases into a search engine dialogue box. This keyphrase would be transmitted across the global computing network 16 to various servers and databases operating as information service providers, 20 and 22, in addition to searchable databases 24. Results of this single search are transmitted across the global computer network 16 to the broker and displayed in web browser 12. The broker may open each retrieved article individually to view. If the article contains topics of interest to a specific individual, broker may utilize the electronic mail application 14 and electronically mail the selected article to an individual. An individual, using a computing device 30, opens electronic mail application tool 34 to read the article in this tool or selects the hyperlink and views the article in web browser 32. This search is repeated for every interest of every individual for each of the broker's individuals. It becomes apparent that, due to the manual nature of this process, it is very time-consuming and tedious, especially when the broker has a large clientele.

Figure 2:
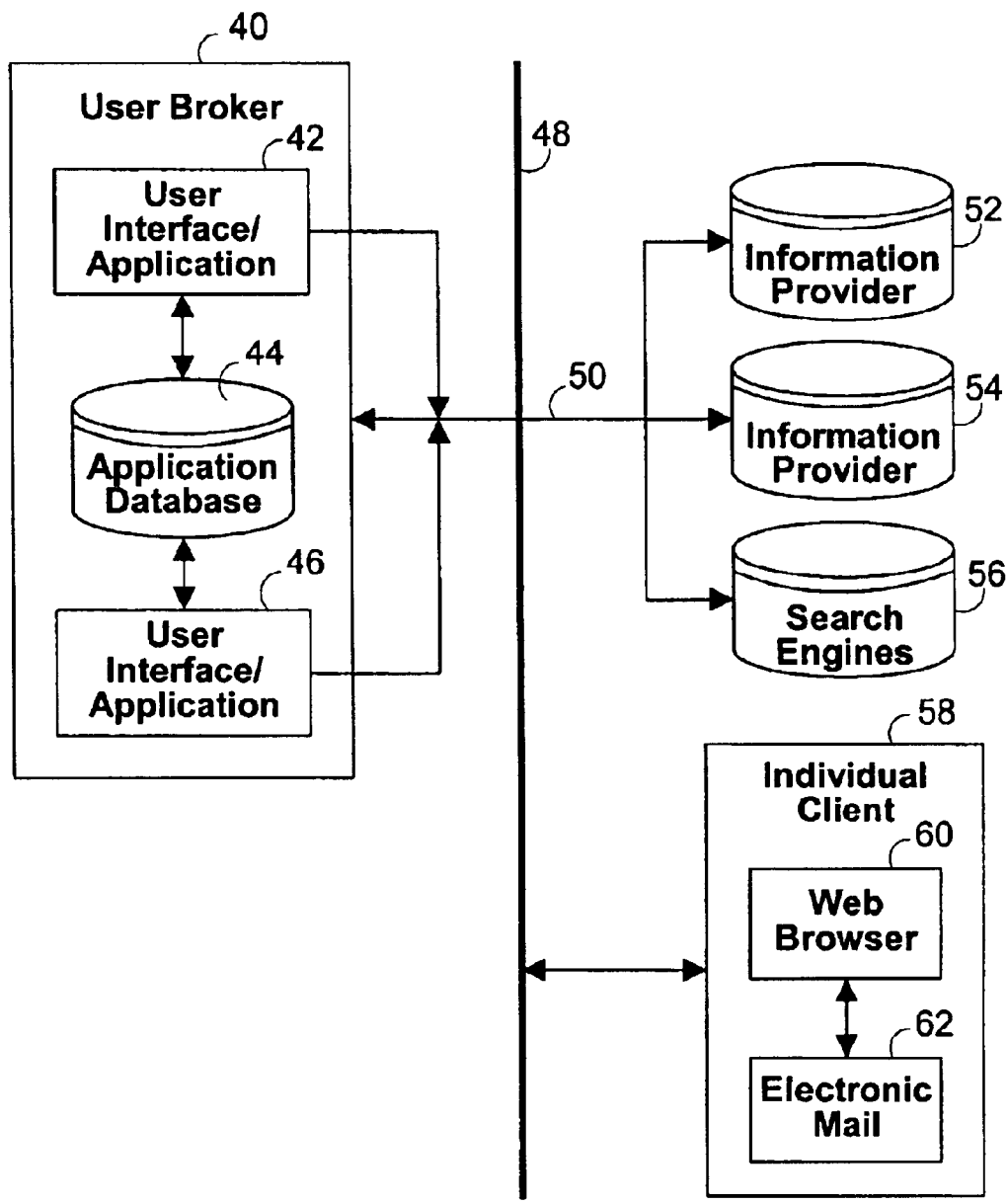
FIG. 2 is a hardware/software schematic illustrating the general method of operation for the present invention.

FIG. 2 is a hardware/software schematic illustrating the general method of operation of the present invention. In FIG. 2, the relationship manager identified as "user-broker" operates computing device 40, which may be a personal computer, wireless device, or web-enabled phone that is connected to any local or global network 48 by any connectivity means 50 which includes but is not limited to telephone modem, broadband, digital cable, wireless data link, local area network, wide area network, optical network, intranet, internet, or any combination thereof. The broker software application and graphical user interface ("application") installed on the broker computing device 40 is comprised of the front-end user interface/application 42, and multi-tiered database 44. In an alternative mode, the broker software application may also be comprised of an application search agent 46. In the present invention, broker opens or launches the user interface and application 42 on computing device 40 to load profiles of individuals and corresponding keyphrase information, to initiate real-time clientele queries based on user-based or individual-based keyphrases, and to take action which will be disclosed in FIGS. 3 through 7. Initially, broker opens application tool 42 and loads or imports individual information such as client/customer name, business, address, birth date, and one or more keyphrases. "Keyphrases" are a single or plurality of words that express a significant interest, hobby or concept of interest to the broker and to each individual. The individual profiles and associated keyphrases are stored in multi-tiered database 44 of application 42. After profile information is complete for one or more individuals, the broker may initiate a query on one or more user-based keyphrases or individual-based keyphrases. In the alternative, broker may schedule queries to initiate automatically via utilizing search agent 46 by entering times and dates to query. A search, whether initiated by user or scheduled using search agent 46, initiates a query across a network 48 by means of a communication network 50 to access objects such as articles, documents or other objects stored on one or more information providers 52, 54 and/or other search engines 56. The results are retrieved by application 42 for broker viewing and action. Broker may select a single article and take action, such as electronically mailing the selected article by means of network 48 to one or more individuals who access the article through their computing device 58. The Individual, on computing device 58, may open the electronically mailed article in an electronic mail application 62 or view the article by means of browser 60.

Figure 3:
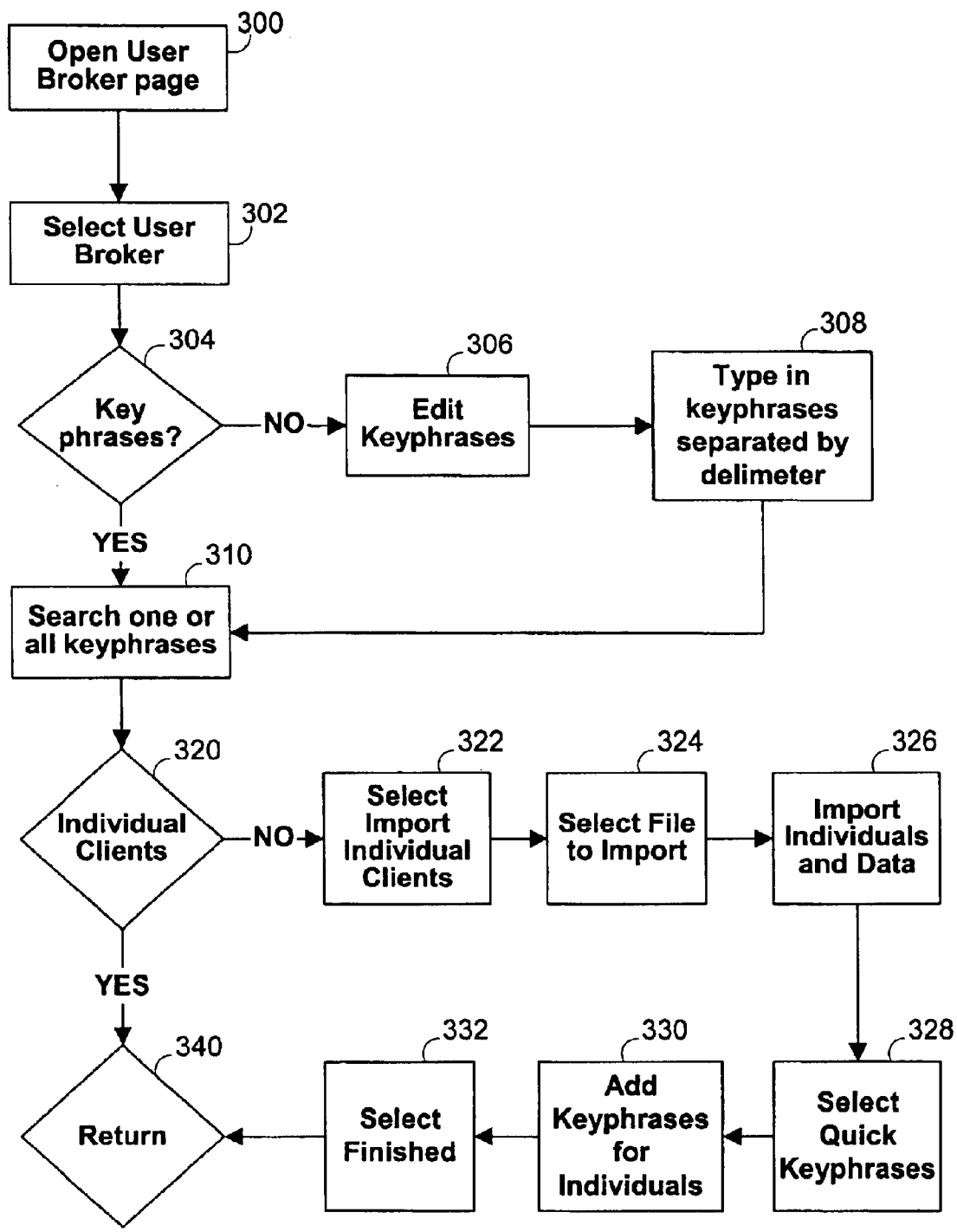
FIG. 3 is a flow diagram illustrating the general method of operation for enabling or setting-up the present invention.

FIG. 3 is a flow diagram illustrating the general method of operation for enabling or setting up the application and database of the present invention. After a user or broker installs the software application, he or she must set-up the application. At step 300, user opens broker page and selects a broker name 302 from a table list to add, delete or modify. To add a new broker to the application, user may select the new broker function, which initiates an algorithm to create a database entry and properties for the new broker based on name. At step 304, the existence of keyphrases is queried by the system and displayed in the drop-down or edit box. If no keyphrases are found at step 306 and the user edits keyphrases by utilizing an add/edit/delete toolbar and entering one or more keyphrases, at step 308, separated by a delimiter, such as a comma. At step 310, a query based on one selected keyphrase or all keyphrases is now conducted by the application. At step 304, in the alternative, if keyphrases are found, the user may proceed to search one or search all keyphrases at step 310.

At step 320, after one or more broker profiles and user-based keyphrases are added to the application database, the application determines whether individual profiles exist in the database. If individual profiles do not exist, the application prompts the user to add individual profiles to the application database at step 322. The user adds individuals by selecting the file to import at step 324 and imports the individual profile data at step 326 from any third party CRM, address book, browser, electronic mail system or database. At step 328, after the algorithm loads the individual profile information into the application database, the user then associates individual-based keyphrases to each individual by selecting the quick keyphrases algorithm. At step 330, for each individual added the user is prompted by the quick keyphrases algorithm to add one or more keyphrases to each corresponding individual profile. At step 332, after completing individual profile information, the user returns to the main application page of step 340.

At step 320, if individuals do exist in the system, the user may return to the main application page 340 or add new individuals and/or add new individual-based keyphrases as disclosed in steps 322 through 332.

Figure 4:
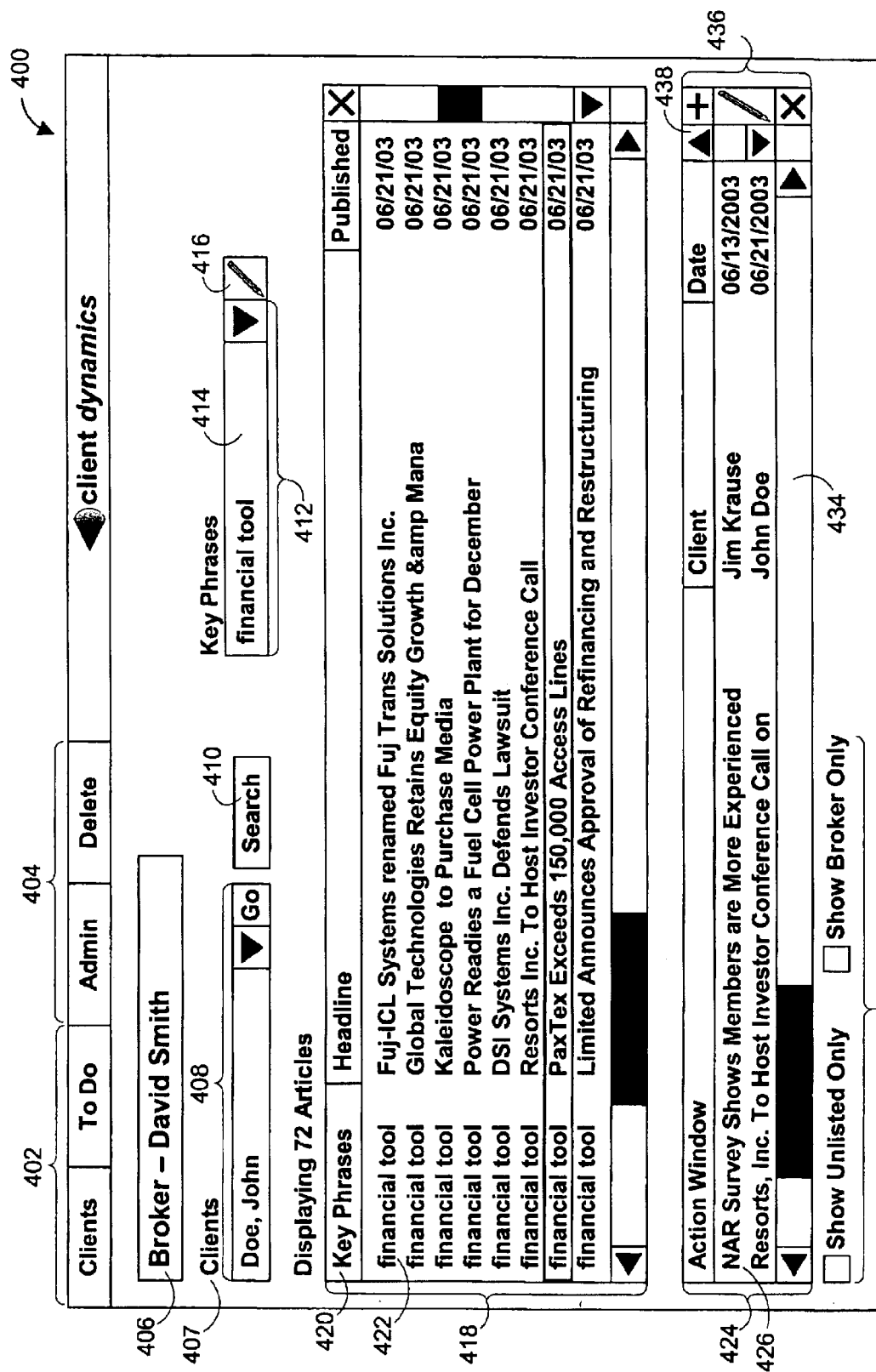
FIG. 4 is a diagram depicting a screen shot of a specific implementation of the present invention in the preferred embodiment.

FIG. 4 is a diagram depicting a non-limiting screen shot of a specific implementation of the present invention in the preferred embodiment. In this example, the application is used to add individuals, associate keyphrases, query information service providers for objects, return results in a text viewing dialogue box, and take action such as electronically mail or add the object or article of interest to a to-do list. This example is just one implementation of the present invention and is presented in order to distinctly point out the principles discussed herein and should not be construed to limit the scope of the present invention.

The specific implementation of the present invention 400 will be referred to as the real-time, database query, information delivery application and user interface, or more simply, the "user interface". The user interface 400 comprises a menu area 402, broker area 406, "client" functions 407, retrieved-results viewing window 418, action window 424 and additional functions 430.

The menu area 402 includes functionality such as File-Exit, Edit-Cut, Copy and Paste, Tools, Go, Help and other application level functions. Menu area 402, in the present invention, utilizes an algorithm to automatically import individual profiles from any other commercial database or CRM such as Microsoft® Outlook®, ACT®, Goldmine®, and other third party databases, maps one or more keyphrases to one or more individual profiles, and allows the user to add, edit delete, search, print, import, export, and perform action on objects or articles. Menu area 402 comprises additional menu functions 404. Additional menu functions 404 are used to open sub-menu windows to perform tasks in this specific implementation of the present invention related to "Brokers", "Clients", "To Do", "Admin" and "Import", disclosed in FIGS. 5 through 7.

The present user of the application is shown in broker display line 406 and designates which broker profile is using the system. Displaying the present user, "broker", allows the user to create one or more broker profiles to differentiate clientele groups or, alternatively, for one or more users to use the single application deployed on one computing device. In this preferred embodiment, the present user is displayed as a "broker" but may be any relationship manager such as a dealer, stock broker, financial analyst, direct sales, indirect sales, real estate agent, travel agent, insurance agent or professional. In this specific example, the present user is "Broker-David Smith" who is responsible for a particular clientele.

The term "Client" is used instead of the term "individual" to discuss this specific implementation of the present invention and refers to an individual client/customer. "Client" functions 407 includes "client" drop-down list 408, "Go" function 409, search functions 410, keyphrases drop-down list 412, status area 414, and add keyphrases 416. In this example, the broker 406 has selected "Doe, John" from the "client" drop-down list 408 from the list of all available "clients" in the application. This list of "clients" is generated by the application as a result of importing or creating "clients" as disclosed in FIG. 3. The user may select "Go" 409 to initiate an immediate keyphrase search of news service databases, information providers or other external sources which are queried based on one or more keyphrases entered in the profile of the selected broker-based or individual-based keyphrases. The query may be initiated using one or more keyphrases. Objects such as articles and documents, which have occurrences of the keyphrases, are retrieved and displayed in retrieved results viewing window 418. Alternatively, in this specific implementation of the present invention, the user may conduct a search 410 by selecting "search one" or "search all" for searching by "one" or "all" of the broker-based keyphrases from the keyphrase drop-down list 412. Alternatively, the user may add new, broker-based keyphrases 416 and subsequently select "search one" or "search all" 410. Selecting add new keyphrases 416 opens a dialogue box which allows the user to add, modify or delete one or more keyphrases where adding or modifying keyphrases opens a sub-dialogue box to enter or modify keyphrases. Performing any action in user interface 400 will display the real-time status in status area 414. For example, selecting search 410 will display a message, such as "searching and retrieving . . . ", indicating that the application is searching databases and informing the user of the query action that was initiated in real-time status area 414.

Retrieved-results viewing window 418 includes table-headings 420, retrieved-results list 422, and scrolling functions 434. After a user has selected at least one or more keyphrases from the keyphrase drop-down list 412 and performed a search function 410, the number of retrieved results will be displayed at the top of the retrieved-results viewing window 418. The actual results are displayed in the retrieved-results area 422 with each column labeled by table-headings 420. In this specific implementation of the present invention, table-headings 420 are comprised of columns labeled as keyphrase, headline, date published, and the source of the information. User may select or detect any label on table-headings 420 to sort by that particular column label. For example, the user may select or detect "headline" whereby the results displayed in retrieved-results area 422 will be sorted in ascending or descending order, alphabetically. The user may select horizontal or vertical scroll-bars 434 to navigate left and right or up and down. The user may select any specific retrieved object in retrieved-results area 422 to view the entire retrieved object and take possible action.

Action window 424 consists of action items list 426, action item functions 436, and scrolling functions 438. In this specific implementation of the present invention, action window 424 includes table-headings "To-Do list—Action Items", "Client", and date "Entered". In an alternative embodiment, the user may select or detect any label in action window table headings 424 to sort by that particular column label. For example, the user may select or detect "Client" whereby the results displayed in action items list 426 will be sorted in ascending or descending order, alphabetically. Action window 424 lists objects or articles and actions required when the user has previously selected a retrieved article from the retrieved article list 422, opened the article and selected an action (for example, electronic mail highlighted article to be sent to a selected individual of interest or all individuals). In this example, action item functions 436 allow the user to add new items to the action list 426, edit a selected or highlighted item in action list 426, or delete a selected or highlighted item in action items list 426. The user may select horizontal or vertical scroll-bars 438 to navigate left and right or up and down.

Additional functions 430 include of check boxes to manipulate, filter, or sort the view of displayed action items list 426. In the present example, the user may select "show unfinished [action items] only" or "show broker [related action items] only". Specifically, selecting additional functions 430 executes an algorithm which filters and sorts retrieved items based on user requirements.

Figure 5:
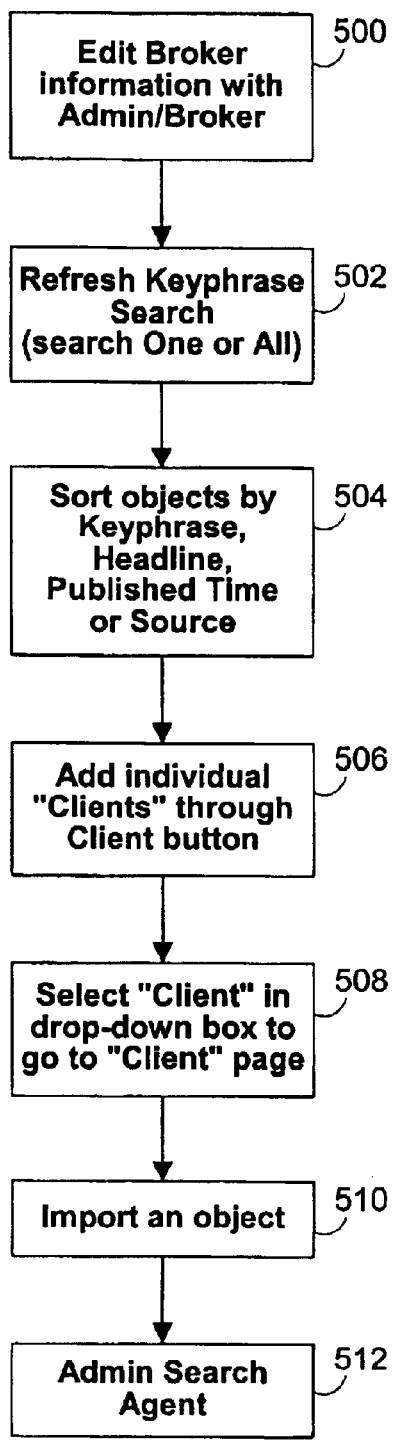
FIG. 5 is a flow diagram of a routine that implements an algorithm for user-initiated functions.

FIG. 5 is a flow diagram of the primary application functionality based on user initiated functions. The user may create one or more broker-based keyphrases, add one or more individuals, add one or more individual-based keyphrases, import objects, take action such as electronically mail, or add items to the action list. The term "action list" is used interchangeably with the term "to-do list".

Figure 6:
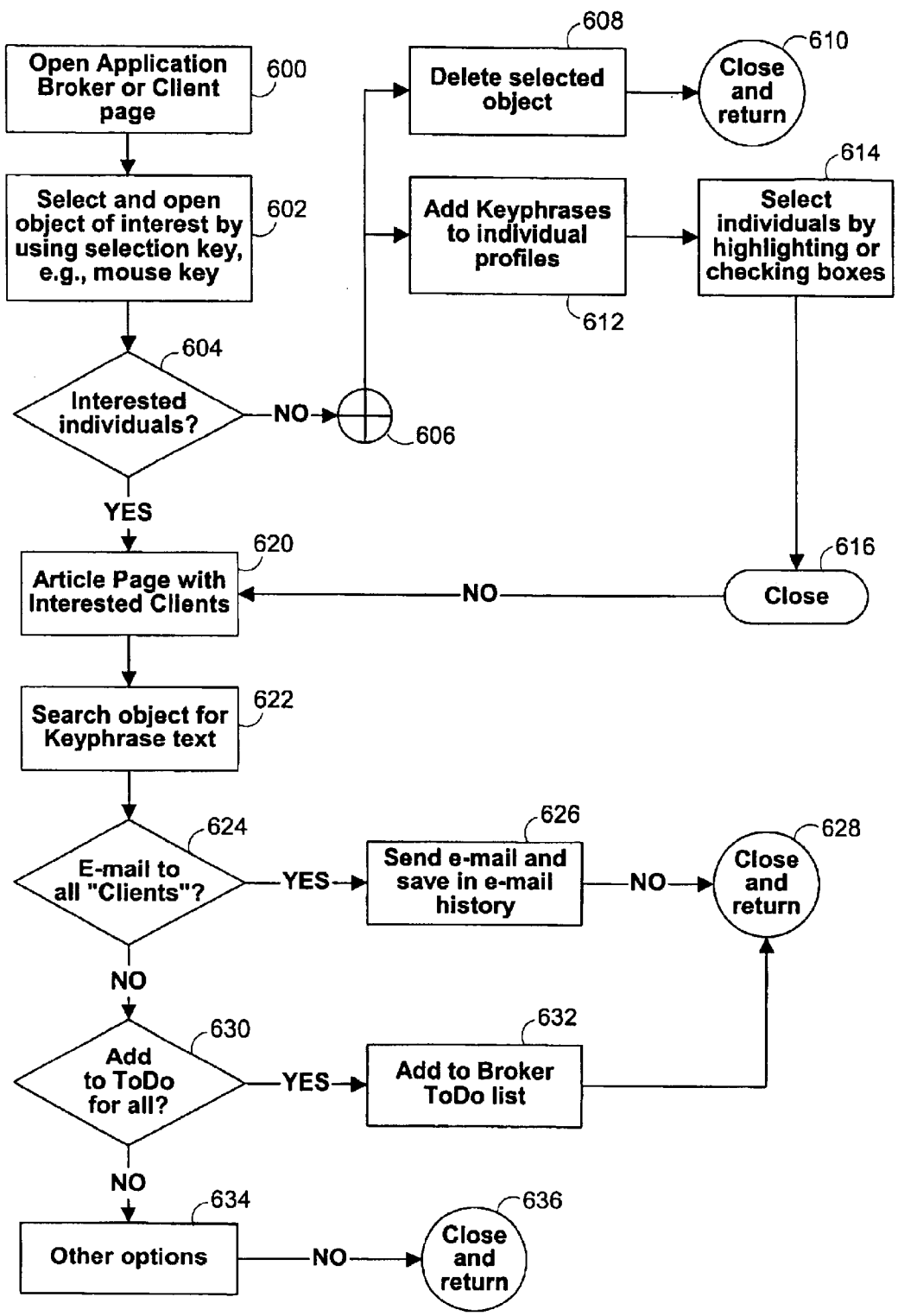
FIG. 6 is a flow diagram of a routine that implements an algorithm for operating on retrieved objects.
Figure 7:
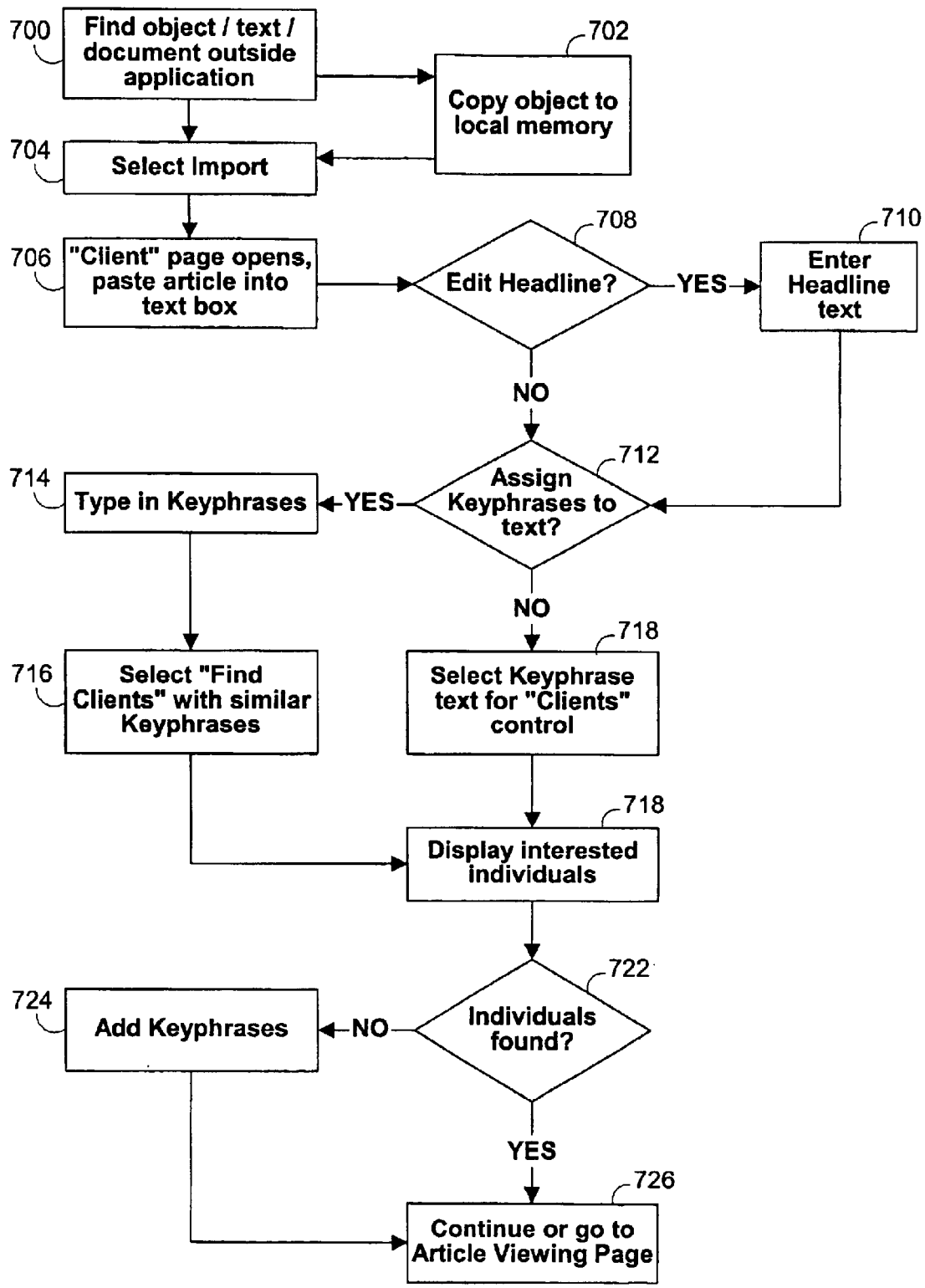
FIG. 7 is a flow diagram of a routine that implements an algorithm to import objects external to the application.

At step 500, the user may edit user profile data stored in the application database. Selecting "broker administration" will open a dialogue box that lists a table of brokers listed by last name and first name. A user may wish to add a new broker by selecting the "add new broker control" or edit an existing broker by selecting the appropriate broker. Editing an existing broker or adding a new broker will open an edit broker dialogue box. The edit broker dialogue box collects user specified information such as broker name, username, title, priority, to-do display control, edit, add and delete keyphrase control. Saving information will store the updated information in the appropriate broker profile in the application database. At step 502, the user initiates the search algorithm by selecting search one or search all as disclosed in FIG. 4. At step 504, the user may select the table heading control in the article viewing dialogue box to sort the retrieved articles by that heading. For example, selecting the table header "headline" (FIG. 4) will sort retrieved articles in ascending or descending order. At step 506, the user may add one or more new individuals or modify existing one or more individuals as disclosed in FIG. 3. In the alternative, at step 508, the user may select an individual from the "client" drop-down list which opens the "client" dialogue box. The "client" dialogue box displays retrieved articles specifically relating to one or more keyphrases mapped to that specific individual's profile in the application database. The "client" dialogue box also displays retrieved articles in an article viewing dialogue box that is shown in FIG. 6. At step 510, the user may import one or more articles as shown in FIG. 7. At step 512, the user may administer the keyphrase search agent algorithm. The user may specify calendar dates/times, and select keyphrases to schedule and conduct automated queries. The query is initiated without user interaction based on the user-specified settings.

FIG. 6 is a flow diagram of a routine that implements an algorithm to manipulate objects based on one or more keyphrase queries. At step 600, it is assumed that the application user, for example the broker, has already enabled and set-up the application by adding broker information, adding or importing individual profiles and adding one or more keyphrases. In addition, the broker has already conducted a query based on one or more broker-based or individual-based keyphrases and the results are displayed as in FIG. 4. At step 602, the broker selects a retrieved object, such as an article or document, by utilizing a selection device, such as a mouse or keyboard. The entire text of the retrieved article is opened and displayed in an article viewing dialogue box. An interested individuals list and the associated individual keyphrases are displayed in edit or selection control areas. The article viewing controls for user specified actions are also displayed. At step 604, the algorithm identifies individuals who have associated keyphrases that correspond to, or are equivalent to, those found in the object located by the initial query. At 604, if interested individuals are not found, the algorithm presents the user with the Boolean option "or" at step 606 whereby the user may proceed to one of two options: step 608 "delete" or step 612 "add". At step 606, user may delete the selected article and proceed to step 610 by closing the article viewing dialogue box and returning to the previous page. In the alternative, at step 612, the user may add keyphrases to individuals' profiles whereby the user will be prompted by a dialogue box listing all individuals in the application database. The user may then check the selection box to add the keyphrase text to the profile of each individual selected. At step 616, the user closes the adding keyphrases to "clients" dialogue box and returns to the article viewing dialogue box.

At step 604, if interested individuals are found who have matching keyphrases based on the previous query, or if no individuals were found who had matching keyphrases but keyphrases were added to the profile of one or more individuals, the algorithm proceeds to step 620 whereby the article is displayed along with a list of interested individuals and corresponding keyphrases. At step 622, the user may utilize the keyphrase text algorithm that searches the opened article for matching keyphrases and highlights those keyphrases for viewing. In addition, this algorithm shows all interested individuals in the interested "clients" table list. If no interested individuals are found, the algorithm informs the user by issuing a message control box that is subsequently closed by the user after the message is displayed.

Steps 624 through 634 are action functions which may or may not be selected by the user and performed by the algorithm. At step 624, the user may select the "e-mail to all clients" function whereby the system will electronically mail the retrieved article to all interested individuals listed in the interested "client" table list. Selecting this option initiates a routine to look up the listed individuals' electronic mail addresses in the individual profile database and electronically mail the selected article to all individuals selected by the user. This action is saved in an electronic mail history list in the application database and may be viewed by the user at anytime. At step 628, the user may close the article viewing page and return to the previous broker or "client" pages. If the user does not wish to send an electronic mail to all clients at 624, the user may proceed to step 630 and add the article to "to-do for list for all". If the user selects "to-do list for all", proceeding to step 632, the algorithm adds this task to the broker to-do list for actions selected at a future time. The user may proceed to step 628 to close the current dialogue box, and return to a previous dialogue box, such as the initial broker page. At step 630, if the user does not desire to add the retrieved article to the "to-do list for all", the user may proceed to step 634 which may be, but is not limited to, sending the retrieved article to one or more individuals or adding the retrieved article to one or more "client" to-do lists. After all the user specified electronic mail and to-do functions have been initiated, at step 636, the user may return to the primary application page, such as the broker page.

FIG. 7 is a flow diagram of a routine that implements an algorithm to import one or more objects, such as articles, external to the application. The application allows the user the flexibility of importing objects of interest external to the application, while utilizing the functions of the article viewing dialogue box, such as searching the object for keyphrases and listing individuals who have corresponding keyphrases as disclosed in FIG. 6. Object import is a unique algorithm different from individual list import disclosed FIG. 3. At step 700, the user finds an object, such as an article outside the application. For example, the user may open a standard web browser, go to a standard search engine, and perform a search based on manually entered keywords. In the alternative, the user may open a text document, word processing document, electronic mail or any other application tool that displays text. At step 702, the user performs a standard selection of the desired text and copies the text to the local clipboard (the temporary memory space of the computing device). At step 704, the user selects the import article algorithm of the present invention and an import article dialogue box appears. The user pastes the selected text that resides on the clipboard memory of the computing device into the edit box of the import article dialogue box. At step 708, if the user desires to add a headline or domain name address to the pasted text the program then proceeds to step 710 whereby the user manually enters or pastes the text of the headline or domain name address. The process then proceeds to step 712, discussed further below.

At step 708, if the user does not wish to enter headline text, the user assigns keyphrases in the keyphrase edit box at step 712. At step 714, the user types in one or more keyphrases in the keyphrase edit box. At step 716, the user selects a control that launches the find interested individuals algorithm. The import article algorithm finds keyphrases and corresponding individuals in the application database that match the keyphrases entered in the keyphrase edit box. The process proceeds to step 720.

At step 712, in the alternative, if the user does not wish to add one or more keyphrases to the keyphrase edit control, the user may select the "find control" that directs the algorithm to find individuals based on the words in the pasted or imported text. Selecting this option directs the algorithm to search the pasted article for all words and to compare each word to all user-based or individual-based keyphrases stored in the application database. If one or more matching keyphrases are found, a save dialogue box opens that lists in a tabular form the interested individuals, the corresponding keyphrase or keyphrases, the number of occurrences of the keyphrases found, and a checkbox control allowing the user to save the article for one or more individuals stored in the database. At step 722, selecting "save for each individual" will open the article viewing dialogue box as disclosed in FIG. 6. At step 720, whether individuals were found based on keyphrases entered or an article-based keyphrase textual query, a dialogue box is displayed listing the keyphrases tabularized with the corresponding interested individuals.

At step 722, if interested individuals were found the user selects an individual from the tabularized "client" and keyphrase dialogue box which will open the article viewing dialogue box at step 726 and disclosed in FIG. 6, thus allowing the user to proceed to electronically mail or to-do list algorithms. At step 722, if no interested individuals were found, keyphrases may be added to individual profiles, to the article, or to the keyphrase edit box and a query can again be conducted to find interested individuals by repeating the find interested "clients" algorithm.

At step 726, if no interested individuals were found the user may proceed to another function of the application. If individuals were found and the user wishes to perform tasks, selecting one or more individuals by checking the save "client" checkbox control will open the article in the article viewing dialogue box as disclosed in FIG. 6.

We claim:

1. A method of providing a user with information that is of interest to a group of individuals associated with the user comprising:
    storing in a user database profile data for each individual in the group, said profile data including at least one keyphrase associated with at least one of the individuals in the group;
    searching in at least one external database for objects in which the keyphrase is utilized;
    retrieving the objects in which the keyphrase is utilized;
    associating the retrieved objects to at least one individual in the group with whom the keyphrase is associated; and
    displaying to the user the keyphrase, a list of the objects in which the keyphrase is utilized, and a list of the individuals associated with the keyphrase.

2. The method of claim 1, wherein the profile data for the group of individuals is initially stored in a profile database, and the step of storing the profile data in the user database includes importing the profile data from the profile database into the user database.

3. The method of claim 1, wherein the profile data includes an electronic address for each individual, and the method further comprises electronically communicating the retrieved objects from the user to the individuals associated with the keyphrase.

4. The method of claim 3, wherein the user is a service provider, wherein the individuals are customers of the user, wherein the objects are information content of interest to the user's customers, and wherein the step of electronically communicating the objects includes the steps of:
    storing the information content in which the keyphrase is utilized in a memory; and
    interfacing the memory with a communication application that electronically communicates the information content selected by the service provider to customers selected by the service provider.

5. The method of claim 1, wherein searching in at least one external database includes automatically searching in the external database on a schedule defined by the user.

6. A system for providing a user with information that is of interest to a group of individuals associated with the user comprising:
    a user database for storing profile data for each individual in the group, said profile data including, for at least one individual, at least one keyphrase associated with the individual;
    a search engine that searches in at least one external database and retrieves objects in which the keyphrase is utilized;
    a component for associating the retrieved objects with at least one individual in the group with whom the keyphrase is associated; and
    a user display that displays to the user the keyphrase, a list of the objects in which the keyphrase is utilized, and a list of the individuals associated with the keyphrase.

7. The system of claim 6, wherein the profile data for the group of individuals is initially stored in a profile database, and the system further comprises a component for importing the profile data from the profile database into the user database.

8. The system of claim 6, wherein the profile data includes an electronic address for each individual, and the system further comprises a component for electronically communicating the objects in which the keyphrase is utilized from the user to the individuals associated with the keyphrase.

9. The system of claim 8, wherein the user is a relationship manager, wherein the individuals are clients of the user, wherein the objects are information content of interest to the user's clients, and wherein the component for electronically communicating the objects includes:
    a memory for storing the information content in which the keyphrase is utilized; and
    a communication application interfaced with the memory that electronically communicates the information content selected by the relationship manager to clients selected by the relationship manager.

10. The system of claim 6 wherein the search engine includes a scheduler that causes the search engine to automatically search in the external database on a schedule defined by the user.

11. A system for providing a user with information that is of interest to a group of individuals associated with the user comprising:
    means for storing in a user database profile data for each individual in the group, said profile data including at least one keyphrase associated with at least one of the individuals in the group;
    means for means for searching in at least one external database for objects in which the keyphrase is utilized;
    means for retrieving the objects in which the keyphrase is utilized;
    means for associating the retrieved objects to at least one individual in the group with whom the keyphrase is associated; and
    means for displaying to the user, the keyphrase, a list of the objects in which the keyphrase is utilized, and a list of the individuals associated with the keyphrase.

12. The system of claim 11 wherein the profile data for the group of individuals is initially stored in a profile database, and wherein the means for storing the profile data in the user database include means for importing the profile data from the profile database into the user database.

13. The system of claim 11 wherein the profile data includes an electronic address for each individual, and wherein the system further comprises means for electronically communicating the retrieved objects from the user to the individuals associated with the keyphrase.

14. The system of claim 13 wherein the user is a service provider, wherein the individuals are customers of the user, wherein the objects are information content of interest to the user's customers, and wherein the means for electronically communicating the objects comprises:

means for storing the information content in which the keyphrase is utilized in a memory; and means for interfacing the memory with a communication application that electronically communicates the information content selected by the service provider to customers selected by the service provider.

15. The system of claim 11 wherein the means for searching in at least one external database include means for automatically searching in the external database on a schedule defined by the user.

16. A machine-readable medium having machine program logic recorded thereon for:

storing in a user database profile data for each individual in the group, said profile data including at least one keyphrase associated with at least one of the individuals in the group;

searching in at least one external database for objects in which the keyphrase is utilized;

retrieving the objects in which the keyphrase is utilized;

associating the retrieved objects to at least one individual in the group with whom the keyphrase is associated; and displaying to the user the keyphrase, a list of the objects in which the keyphrase is utilized, and a list of the individuals associated with the keyphrase.

17. The machine-readable medium of claim 16 wherein the profile data for the group of individuals is initially stored in a profile database, and wherein the machine program logic for storing the profile data in the user database includes machine program logic for importing the profile data from the profile database into the user database.

18. The machine-readable medium of claim 16 wherein the profile data includes an electronic address for each individual, and wherein the machine-readable medium includes machine program logic recorded thereon for electronically communicating the retrieved objects from the user to the individuals associated with the keyphrase.

19. The machine-readable medium of claim 18 wherein the user is a service provider, wherein the individuals are customers of the user, wherein the objects are information content of interest to the user's customers, and wherein the machine-readable medium includes machine program logic for:

storing the information content in which the keyphrase is utilized in a memory; and interfacing the memory with a communication application that electronically communicates the information content selected by the service provider to customers selected by the service provider.

20. The machine-readable medium of claim 16 wherein the searching in at least one external database includes automatically searching in the external database on a schedule defined by the user.

* * * * *